United States Patent
Tanaka et al.

(12)

(10) Patent No.: US 8,935,970 B2
(45) Date of Patent: Jan. 20, 2015

(54) TWIN-CLUTCH TYPE TRANSMISSION UNIT FOR ENGINE, AND MOTORCYCLE INCORPORATING THE SAME

(75) Inventors: Masataka Tanaka, Saitama (JP); Junya Watanabe, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 368 days.

(21) Appl. No.: 13/164,132

(22) Filed: Jun. 20, 2011

(65) Prior Publication Data

US 2011/0314961 A1    Dec. 29, 2011

(30) Foreign Application Priority Data

Jun. 24, 2010    (JP) .................. 2010-144227

(51) Int. Cl.
| | |
|---|---|
| *F16H 37/06* | (2006.01) |
| *F16H 61/688* | (2006.01) |
| *F16H 63/48* | (2006.01) |
| *F16H 3/00* | (2006.01) |
| *F16H 63/18* | (2006.01) |

(52) U.S. Cl.
CPC .............. *F16H 61/688* (2013.01); *F16H 63/48* (2013.01); *F16H 3/006* (2013.01); *F16H 2312/20* (2013.01); *F16H 63/18* (2013.01); *F16H 2312/02* (2013.01)
USPC .......................................... 74/665 E; 192/48

(58) Field of Classification Search
USPC ........ 74/665 E, 721, 322, 330, 325, 345, 356, 74/355, 358, 372; 192/48.611
See application file for complete search history.

(56) References Cited

U.S. PATENT DOCUMENTS

| | | | | |
|---|---|---|---|---|
| 2,838,940 | A | * | 6/1958 | Swenson et al. ................ 74/15.2 |
| 4,273,001 | A | * | 6/1981 | Miyahara et al. ............... 74/359 |
| 4,719,819 | A | * | 1/1988 | Tsutsumikoshi et al. ....... 74/745 |
| 5,105,674 | A | * | 4/1992 | Rea et al. ......................... 74/333 |
| 6,023,987 | A | * | 2/2000 | Forsyth ........................... 74/331 |
| 6,209,406 | B1 | * | 4/2001 | Sperber et al. .................. 74/330 |
| 6,553,868 | B2 | * | 4/2003 | Takenaka et al. ........... 74/665 B |
| 6,805,026 | B2 | * | 10/2004 | Hori et al. .................... 74/730.1 |
| 7,181,989 | B2 | * | 2/2007 | Obinata .......................... 74/330 |
| 7,305,900 | B2 | * | 12/2007 | Suzuki et al. ................... 74/340 |

(Continued)

FOREIGN PATENT DOCUMENTS

| | | |
|---|---|---|
| DE | 35 46 454 A1 | 2/1987 |
| DE | 102 38 419 A1 | 3/2004 |

(Continued)

*Primary Examiner* — Troy Chambers
*Assistant Examiner* — Zakaria Elahmadi
(74) *Attorney, Agent, or Firm* — Carrier Blackman & Associates, P.C.; Joseph P. Carrier; Michael J. McCandlish

(57) ABSTRACT

A twin-clutch type transmission unit includes inner and outer shafts provided respectively with first and second disc clutches for transmission and interruption of input from a prime mover, a plurality of drive gears provided on the inner and outer shafts, and a counter shaft provided with driven gears selectively operable to mesh with the drive gears, with the first and second disc clutches of the inner and outer shafts being alternately disengaged and engaged so as to perform a gear shift. In the transmission unit, a dog-type clutch for synchronizing rotations of the inner shaft and the outer shaft is provided. At the time of vehicle starting, the inner and outer shafts are connected with each other, and the first and second disc clutches of both the inner and outer shafts are engaged. Such transmission unit contrives reductions in the size and weight of a twin-clutch type transmission unit.

20 Claims, 7 Drawing Sheets

(56) References Cited

U.S. PATENT DOCUMENTS

| | | | |
|---|---|---|---|
| 7,694,597 B2* | 4/2010 | Nishi et al. | 74/325 |
| 7,841,252 B2 | 11/2010 | Remmler | |
| 7,926,636 B2* | 4/2011 | Ogasawara et al. | 192/48.611 |
| 8,109,166 B2* | 2/2012 | Tsukada et al. | 74/330 |
| 2003/0121341 A1* | 7/2003 | Hori et al. | 74/325 |
| 2005/0183527 A1* | 8/2005 | Hori et al. | 74/325 |
| 2006/0219034 A1* | 10/2006 | Hori et al. | 74/330 |
| 2008/0092681 A1* | 4/2008 | Remmler | 74/331 |
| 2009/0084209 A1* | 4/2009 | Tsukada et al. | 74/330 |
| 2010/0072019 A1* | 3/2010 | Ogasawara | 192/48.611 |
| 2011/0030506 A1* | 2/2011 | Singh et al. | 74/665 E |
| 2011/0232400 A1* | 9/2011 | Tanaka et al. | 74/325 |

FOREIGN PATENT DOCUMENTS

| | | |
|---|---|---|
| DE | 10 2004 041525 A1 | 3/2006 |
| EP | 1 013 966 A1 | 6/2000 |
| EP | 1 835 204 A1 | 9/2007 |
| EP | 2 019 229 A2 | 1/2009 |
| JP | 2006-105221 A | 4/2006 |
| JP | 2008-089064 A | 4/2008 |

* cited by examiner

TWIN-CLUTCH TYPE TRANSMISSION UNIT FOR ENGINE, AND MOTORCYCLE INCORPORATING THE SAME

CROSS-REFERENCE TO RELATED APPLICATIONS

The present invention claims priority under 35 USC 119 based on Japanese patent application No. 2010-144227, filed on Jun. 24, 2010. The entire subject matter of this priority document, including specification claims and drawings thereof, is incorporated by reference herein.

BACKGROUND OF THE INVENTION

1. Field of the Invention

The present invention relates to a twin-clutch type transmission unit for an engine, and to a motorcycle including the same. More particularly, the present invention relates to a twin-clutch type transmission unit provided with two clutches, and to a motorcycle including the same.

2. Description of the Background Art

There is a known twin-clutch type transmission unit in which a first input shaft and a second input shaft disposed coaxially are provided respectively with a first clutch and a second clutch for transmission and interruption of input from an engine, a plurality of gear pairs for transmission are provided between the first and second input shafts and an output shaft, and the first clutch and the second clutch are alternately disengaged and engaged so as to perform a gear shift. An example of such twin-clutch type transmission unit is disclosed in the Japanese Patent Laid-open No. 2008-89064.

In general, the capacity of a clutch for gear shift is designed according to the capacity at the time of vehicle starting when the rotational acceleration is the greatest. However, a clutch capacity as high as that at the time of vehicle starting is not needed during normal vehicle running. In an existing above-mentioned twin-clutch type transmission unit, two sets of clutches for gear shift are used. Use of two sets of clutches disadvantageously results in increased clutch weight and enlarged clutch size. Therefore, reductions in the size and weight of the twin-clutch type transmission unit are being desired.

The present invention has been made to overcome the drawbacks of existing twin-clutch type transmission unit. Accordingly, it is one of the objects of the present invention to contrive reductions in the size and weight of a twin-clutch type transmission unit.

SUMMARY OF THE INVENTION

In order to achieve the above objects, the present invention according to a first aspect thereof provides a twin-clutch type transmission unit including a first input shaft and a second input shaft (41m, 41n) provided respectively with clutches (151a, 151b) for transmission and interruption of input from a prime mover (1), a plurality of drive gears (m1 to m6) provided on the first and second input shafts (41m, 41n), and an output shaft (42) provided with driven gears (n1 to n6) meshed with the drive gears (m1 to m6), with the clutches (151a, 151b) of the first input shaft (41m) and the second input shaft (41n) being alternately disengaged and engaged so as to perform a gear shift, characterized in that clutch device (60) for synchronizing rotation of the first input shaft (41m) and rotation of the second input shaft (41n) is provided, and, at the time of vehicle starting, the first input shaft (41m) and the second input shaft (41n) are connected to each other, and the clutches (151a, 151b) of both the first and second input shafts (41m, 41n) are engaged.

According to the first aspect of the present invention, the clutch device for synchronizing the rotations of the first input shaft and the second input shaft which are provided respectively with the clutches for transmission and interruption of input from the prime mover is provided, and at the time of vehicle starting, the first input shaft and the second input shaft are connected to each other, and the clutches of both the first and second input shafts are engaged. Therefore, the two clutches can be used at the time of vehicle starting. This ensures that the capacities of the clutches provided on the first input shaft and the second input shaft can be reduced according to the capacity required at the time of normal vehicle running. Consequently, it is possible to contrive reductions in the size and weight of the twin-clutch type transmission unit.

In addition, in the above-mentioned configuration, a configuration may be adopted in which after the vehicle starting, the first input shaft (41m) and the second input shaft (41n) are disconnected from each other at the time when the rotation of the prime mover (1) has reached a predetermined rotating speed.

In this case, the first input shaft and the second input shaft are disconnected from each other at the time when the rotation of the prime mover had reached the predetermined rotating speed after the vehicle starting, whereby rotation of both the first input shaft and the second input shaft can be prevented from occurring after the vehicle starting. Therefore, fuel consumption can be improved.

Besides, a configuration may be adopted in which the first input shaft (41m) and the second input shaft (41n) are composed of an inner-outer double shaft having an inner input shaft (41m) and an outer input shaft (41n), and the clutch device for synchronizing the rotation of the first input shaft (41m) and the rotation of the second input shaft (41n) is provided between an end portion (135) of the outer input shaft (41n) and the inner input shaft (41m).

In this case, the outer input shaft and the inner input shaft composed of the inner-outer double shaft are synchronized by the clutch device provided between an end portion of the outer input shaft and the inner input shaft. Therefore, the first input shaft and the second input shaft can be interconnected and disconnected using a simple configuration.

Further, a configuration may be adopted in which the clutch device (160) includes a dog-type clutch (160) in which at least one of the drive gears (m4) provided at the end portion (135) of the outer input shaft (41n) and a drive gear (m3) provided on the inner input shaft (41m) adjacently to the drive gear (m4) provided at the end portion (135) of the outer input shaft (41n) is moved in the axial direction to be fitted to the other.

In this case, the clutch device has the dog-type clutch in which at least one of the gears provided at an end portion of the outer input shaft and the gear provided on the inner input shaft adjacently to the gear provided at the end portion is moved in the axial direction to be fitted to the other. Therefore, the first input shaft and the second input shaft can be interconnected and disconnected using a simple configuration.

In addition, according to the present invention, there is provided a twin-clutch type transmission unit including a first input shaft and a second input shaft (41m, 41n) provided respectively with clutches (151a, 151b) for transmission and interruption of input from a prime mover (1), a plurality of drive gears (m1 to m6) provided on the first and second input shafts (41m, 41n), and an output shaft (42) provided with driven gears (n1 to n6) meshed with the drive gears (m1 to m6), with the clutches (151a, 151b) of the first input shaft (41*m*) and the second input shaft (41*n*) being alternately disengaged and engaged so as to perform a gear shift, characterized in that a clutch device for synchronizing rotation of the first input shaft (41*m*) and rotation of the second input shaft (41*n*) is provided, and, at the time of vehicle stop, the rotation of the first input shaft (41*m*) and the rotation of the second input shaft (41*n*) are synchronized with each other, and one of the gears on the first input shaft (41*m*) and one of the gears on the second input shaft (41*n*) are respectively meshed with gears on the output shaft (42).

According to this configuration, the clutch device for synchronizing rotation of the first input shaft and rotation of the second input shaft is provided, and, at the time of vehicle stop, the rotation of the first input shaft and the rotation of the second input shaft are synchronized with each other, and one of the gears on the first input shaft and one of the gears on the second input shaft are respectively meshed with a gear on the output shaft. Therefore, the gears on the first input shaft and the second input shaft are simultaneously meshed with the gear on the output shaft, whereby rotation of the output shaft is locked. Consequently, a parking state of the vehicle can be maintained, without providing a parking brake device or the like for exclusive use for maintaining a parking state of the vehicle.

Besides, in the above-mentioned configuration, a configuration may be adopted in which after vehicle starting, the first input shaft (41*m*) and the second input shaft (41*n*) are disconnected from each other at the time when rotation of the prime mover (1) has reached a predetermined rotating speed.

In this case, rotation of both the first input shaft and the second input shaft can be prevented from occurring after the vehicle starting, so that fuel consumption can be improved.

In addition, a configuration may be adopted in which the first input shaft (41*m*) and the second input shaft (41*n*) are composed of an inner-outer double shaft having an inner input shaft (41*m*) and an outer input shaft (41*n*), and the clutch device (160) for synchronizing the rotation of the first input shaft (41*m*) and the rotation of the second input shaft (41*n*) is provided between an end portion (135) of the outer input shaft (41*n*) and the inner input shaft (41*m*).

In this case, the outer input shaft and the inner input shaft including the inner-outer double shaft are synchronized by the clutch device provided between an end portion of the outer input shaft and the inner input shaft. Therefore, the first input shaft and the second input shaft can be interconnected and disconnected using a simple configuration.

EFFECTS OF THE INVENTION

In the twin-clutch type transmission unit according to the present invention, at the time of vehicle starting, the first input shaft and the second input shaft are interconnected, and the clutches of both the first and second input shafts are engaged. Therefore, the two clutches can be used at the time of vehicle starting. This ensures that the capacities of the clutches provided on the first input shaft and the second input shaft can be reduced according to the capacity needed during normal vehicle running. Accordingly, it is possible to contrive reductions in the size and weight of the twin-clutch type transmission unit.

Besides, after vehicle starting, the first input shaft and the second input shaft are disconnected from each other at the time when the rotation of the prime mover has reached a predetermined rotating speed. Therefore, fuel consumption can be improved.

In addition, since the outer input shaft and the inner input shaft having the inner-outer double shaft are synchronized by the clutch device provided between an end portion of the outer input shaft and the inner input shaft, the first input shaft and the second input shaft can be interconnected and disconnected using a simple configuration.

Further, since the clutch device includes the dog-type clutch, the first input shaft and the second input shaft can be interconnected and disconnected using a simple configuration.

Besides, at the time of vehicle stop, the rotation of the first input shaft and the rotation of the second input shaft are synchronized, and one of the gears on the first input shaft and one of the gears on the second input shaft are respectively meshed with the gear on the output shaft. Therefore, with the gear on the first input shaft and the gear on the second input shaft being simultaneously meshed with the gear on the output shaft, rotation of the output shaft can be locked. Accordingly, a parking state of the vehicle can be maintained, without providing a parking brake device or the like for exclusive use for maintaining a parking state of the vehicle.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
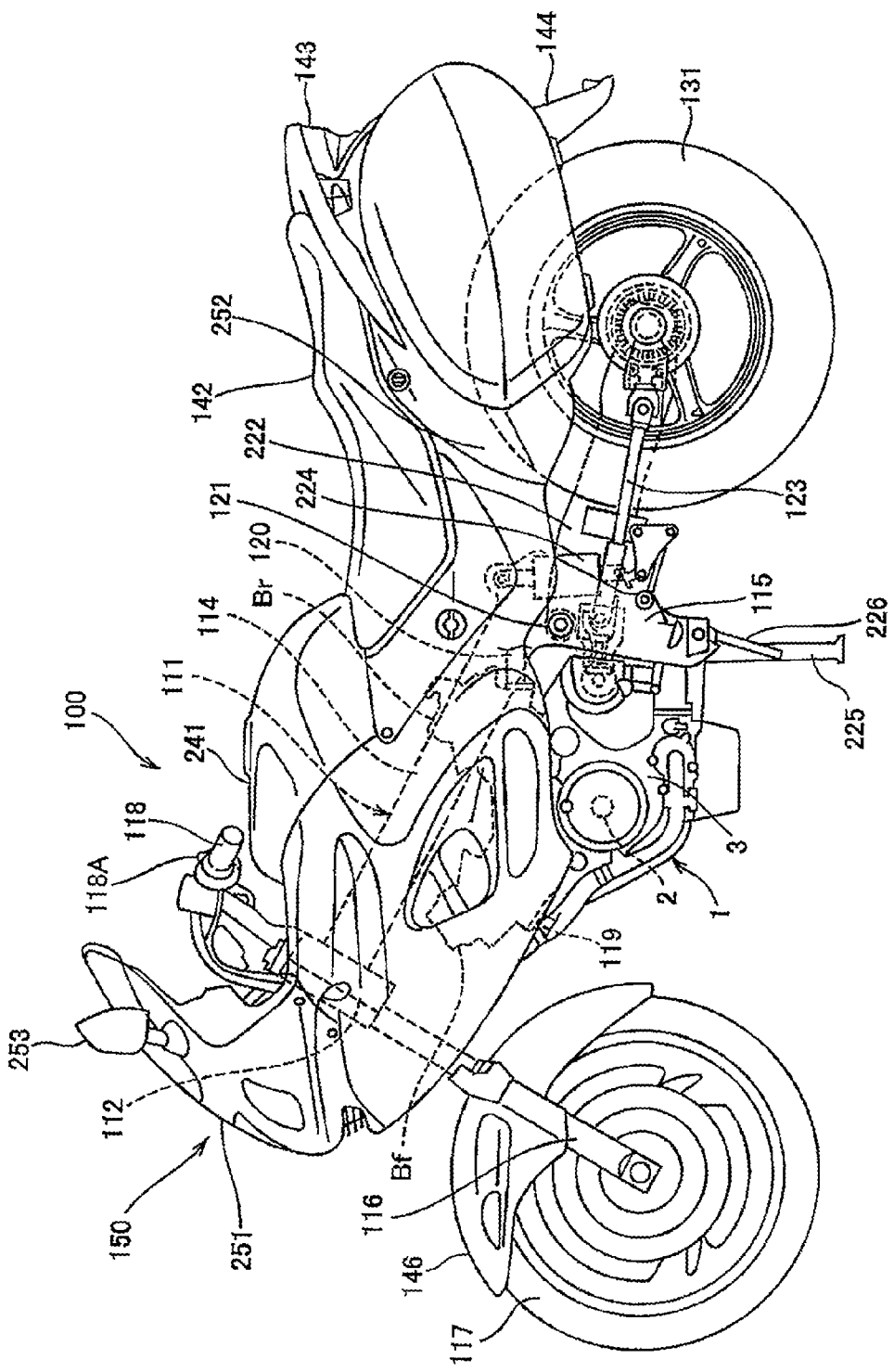
FIG. 1 is a left side view of a motorcycle according to a first embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Now, illustrative embodiments of the present invention will be described below, referring to the drawings.

First Embodiment

FIG. 1 is a side view of a motorcycle according to a first illustrative embodiment of the present invention. As stated above, in the following description, the descriptions of directions such as front, rear, left, right, upper and lower sides will be made with reference to a vehicle body.

A body frame 111 of a motorcycle 100 includes a head pipe 112 located at a front portion of the vehicle body, a pair of left and right main frames 114 extending rearwards from the head pipe 112 to the center of the vehicle body, a pair of left and right pivot plates 115 extending downwards from rear end portions of the main frames 114, and rear frames (not shown)

extending from rear end portions of the main frames 114 to rear portions of the vehicle body. A front fork 116 is turnably mounted on the head pipe 112. A front wheel 117 is rotatably supported on the lower ends of the front fork 116. A steering handle 118 is attached to an upper portion of the head pipe 112.

On the lower side of the main frame 114, a front-rear V-type four-cylinder engine 1 (prime mover) is disposed. The engine 1 is a horizontal layout engine having a crankshaft 2 oriented in the horizontal left-right direction, and is of an OHC type and of a water-cooled type engine. The engine 1 is a narrow-angle V-type engine which has a crankcase 3. A front bank Bf and a rear bank Br each having two cylinders inclined respectively toward the front and rear sides from the crankcase 3 are arranged in V form, with a bank angle therebetween of less than 90 degrees.

One-side ends of a pair of left and right exhaust pipes 119 are connected to exhaust ports of the front bank Bf, are extended downwards from the exhaust ports, laid around toward the vehicle rear side, are collectively connected to a pair of left and right exhaust pipes 120 extending from exhaust ports of the rear bank Br, and the thus collectively connected exhaust pipes are connected through a single exhaust pipe (not shown) to a muffler (not shown) provided on the rear side of the engine 1.

A pivot shaft 121 is provided on the rear side of the engine 1. A rear fork 222 is mounted on the pivot shaft 121 so as to be vertically swingable about the pivot shaft 121. A rear wheel 131 is rotatably supported on rear end portions of the rear fork 222. The rear wheel 131 and the engine 1 are connected to each other by a drive shaft 123 provided in the rear fork 222, and rotational power from the engine 1 is transmitted through the drive shaft 123 to the rear wheel 131. In addition, a rear shock absorber 224 for absorbing shocks from the rear fork 222 is bridgingly disposed between the rear fork 222 and the body frame 111. A stand 225 for putting the vehicle body at rest is provided at a rear portion of the engine 1. A side stand 226 is provided at a lower portion of a left side surface of the engine 1.

On upper portions of the main frames 114, a fuel tank 241 is mounted so as to cover the upper side of the engine 1. A seat 142 is located on the rear side of the fuel tank 241. The seat 142 is supported on the rear frames. A tail lamp 143 is disposed on the rear side of the seat 142, and a rear fender 144 for covering the upper side of the rear wheel 131 is disposed on the lower side of the tail lamp 143.

In addition, the motorcycle 100 has a resin-made body cover 150 for covering the vehicle body. The body cover 150 includes a front cover 251 for continuously covering an area ranging from the front side of the body frame 111 to a front portion of the engine 1, and a rear cover 252 for covering the lower side of the seat 142. A pair of left and right mirrors 253 is mounted to upper portions of the front cover 251. Besides, a front fender 146 for covering the upper side of the front wheel 117 is mounted to the front fork 116.

Figure 2:
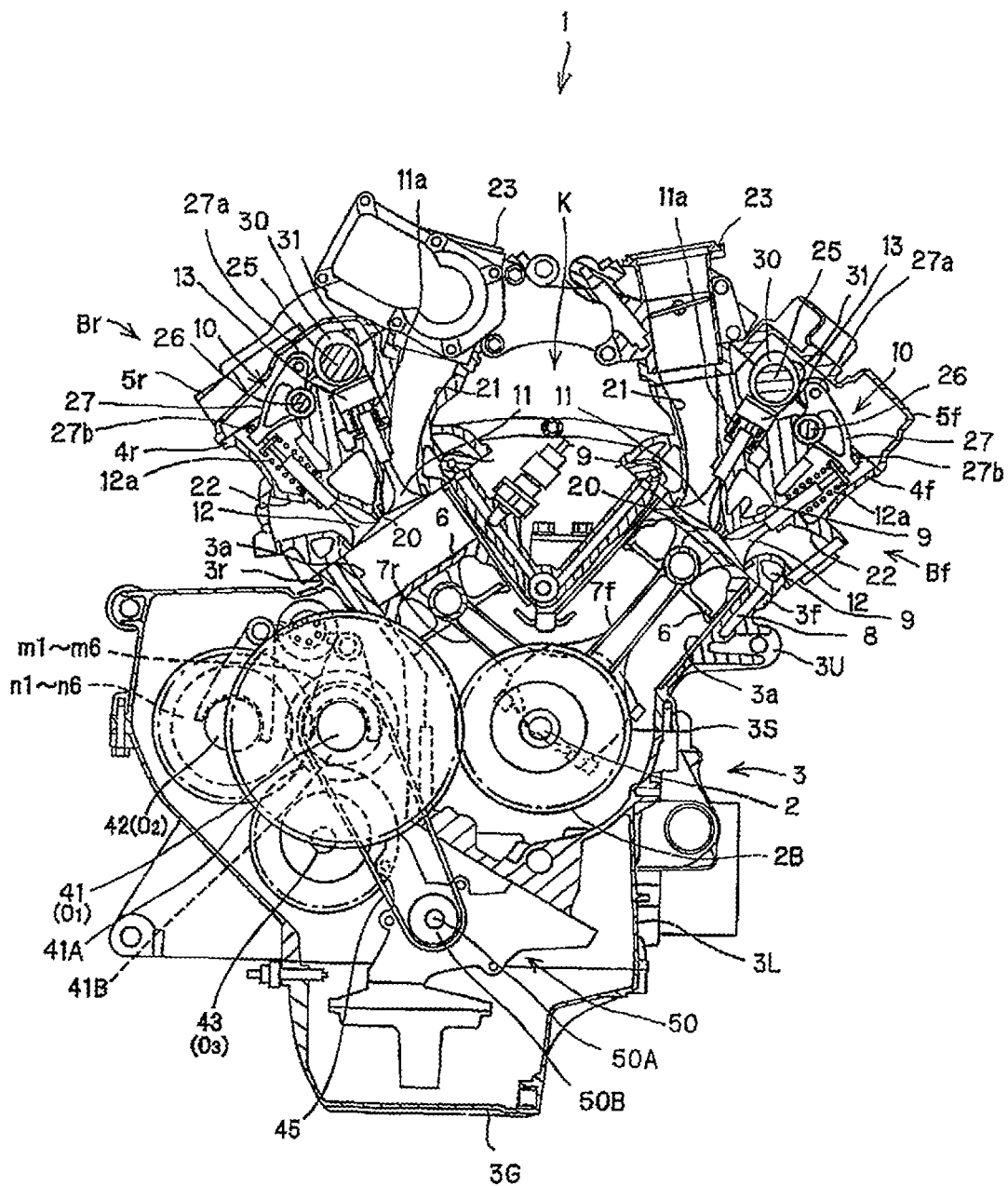
FIG. 2 is a sectional view of an engine.

FIG. 2 is a sectional view of the engine 1. It may be noted that, in FIG. 2, the upper and lower sides in the figure will be taken as the upper and lower sides of the engine 1, the left side in the figure will be taken as the front side of the engine 1, and the right side in the figure will be taken as the rear side of the engine 1, in the following description.

A V-bank space K, which is a space formed to be V-shaped in side view, is formed between the front bank Bf and the rear bank Br.

The crankcase 3 is splittable into upper and lower portions, and has an upper crankcase 3U and a lower crankcase 3L. The crankshaft 2 is rotatably borne in the manner of being clamped between the crankcases 3U and 3L. A front cylinder block 3f and a rear cylinder block 3r each having two cylinders arranged on the left and right sides are integrally formed with the upper crankcase 3U to extend obliquely upwards so that they are V-shaped as a whole in side view.

At a lower portion of the lower crankcase 3L, an oil pan 3G as a reservoir for oil in the engine 1 is provided. The oil pan 3 bulges downwardly. An oil pump 50 for circulating the oil inside the engine 1 is located on the lower side of the crankshaft 2 inside the lower crankcase 3L. A front cylinder head 4f is laid on a front upper side of the front cylinder block 3f and fastened to the front cylinder block 3f by fastening bolts (not shown), and the upper side of the front cylinder head 4f is covered by a front cylinder head cover 5f. Similarly, a rear cylinder head 4r is laid on a rear upper side of the rear cylinder block 3r and fastened to the rear cylinder block 3r by fastening bolts (not shown), and the upper side of the rear cylinder head 4r is covered by a rear cylinder head cover 5r.

The front cylinder block 3f and the rear cylinder block 3r are formed with cylinder bores 3a. In each of the cylinder bores 3a, a piston 6 reciprocated inside the cylinder bore 3a is disposed. The pistons 6 are each connected to the single crankshaft 2 common for the pistons 6, through a connecting rod 7f, 7r. Each of the cylinder blocks 3f, 3r is provided with a water jacket 8, through which cooling water for cooling the cylinder block 3f, 3r flows surrounding the cylinder bores 3a. Each of the front cylinder head 4f and the rear cylinder head 4r is provided with a combustion chamber 20, an intake port 21 and an exhaust port 22 which are located on the upper side of the cylinder bore 3a.

A throttle body 23 for controlling the quantity of a fuel-air mixture flowing into each intake port 21 is connected to the intake port 21. Besides, each of the cylinder heads 4f, 4r is provided with a water jacket 9, through which cooling water for cooling the cylinder head 4f, 4r flows, in the manner of surrounding the intake port 21 and the exhaust port 22. Besides, in each of the cylinder heads 4f, 4r, a pair of intake valves 11 are operatively (being operable to open and close) arranged in the state of being each biased by a valve spring 11a in the direction for closing the intake ports 21, and a pair of exhaust valves 12 are operatively arranged in the state of being each biased by a valve spring 12a in the direction for closing the exhaust ports 22. The intake valves 11 and the exhaust valves 12 are driven to open and close by a valve train 10 of Unicam system in which the valves are actuated by cam shafts 25 provided one for each of the cylinder heads 4f, 4r.

The valve train 10 includes a cam shaft 25 rotatably borne on each of the cylinder heads 4f, 4r on the upper side of the intake valve 11, a rocker shaft 26 fixed to each of the cylinder heads 4f, 4r while having an axis parallel to the cam shaft 25, and a rocker arm 27 oscillatably borne on the rocker shaft 26. The cam shaft 25 has an intake cam 30 and an exhaust cam 31 which are projected to the outer periphery side of the camshaft 25, and is rotated synchronously with the rotation of the crankshaft 2. The intake cam 30 and the exhaust cam 31 each have a cam profile in which the distance (radius) from the center to the outer periphery is not constant. The intake valves 11 and the exhaust valves 12 are moved up and down by variations in the radii when the intake cam 30 and the exhaust cam 31 are rotated. Besides, a valve lifter 13 slidably fitted to each of the cylinder heads 4f, 4r on the lower side of the cam shaft 25 is provided between the cam shaft 25 and the intake valve 11.

At one end of the rocker arm 27 borne on the rocker shaft 26, a roller 27a making rolling contact with the exhaust cam 31 is provided. At the other end of the rocker arm 27, a tappet screw 27b making contact with the upper end of the exhaust valve 12 is screw engaged so that its advanced/retracted position can be adjusted. With the intake cam 30 and the exhaust cam 31 rotated integrally with the cam shaft 25, the intake cam 30 presses down the intake valves 11 through the valve lifter 13, and the exhaust cam 31 presses down the exhaust valves 12 through the rocker arm 27 for operating (opening/closing) the intake ports 21 and the exhaust ports 22 at predetermined timings which are determined by the phases in rotation of the intake cam 30 and the exhaust cam 31.

A main shaft 41, a counter shaft 42 (output shaft), and a driving shaft 43 which are disposed parallel to the crankshaft 2 are arranged inside the crankcase 3. The crankshaft 2, the main shaft 41 and the counter shaft 42 are disposed on the mating plane 3S between the upper crankcase 3U and the lower crankcase 3L. The driving shaft 43 is disposed on the front lower side of the counter shaft 42. Specifically, the axes O1 and O2 of the main shaft 41 and the counter shaft 42 are located at front and rear positions on the mating plane 3S, whereas the axis O3 of the driving shaft 43 is located on the rear side of the axis O1 of the main shaft 41 and on the front lower side of the axis O2 of the counter shaft 42.

A crank-side drive gear 2B is fixed to an end on the cam chain chamber (not shown) side of the crankshaft 2. The crank-side drive gear 2B is in mesh with a main shaft side driven gear 41A on the main shaft 41. As will be described later, the main shaft side driven gear 41A is provided on the main shaft 41 so as to be rotatable relative to the main shaft 41, and is connected to a clutch mechanism (not shown in FIG. 2).

Transmission of power between the crankshaft 2 and the main shaft 41 can be effected and interrupted by operations of the clutch mechanism. The main shaft side driven gear 41A is provided with an oil pump drive gear 41B. The oil pump drive gear 41B is rotated as one body with the main shaft side driven gear 41A, independently from the on/off state (disengaged/engaged state) of the clutch mechanism, whereby the rotation of the crankshaft 2 is transmitted through a drive chain 45 to a driven gear 50B fixed to a pump shaft 50A of the oil pump 50.

The main shaft 41 is provided with drive gears m1 to m6 (a plurality of gears provided on the first and second input shafts) for six gear speeds, while the counter shaft 42 is provided with driven gears n1 to n6 (gears meshed with the gears m1 to m6; gears on the output shaft) for six gear speeds. The drive gears m1 to m6 and the driven gears n1 to n6 are mutually meshed on the basis of each of corresponding gear speeds, to constitute transmission gear pairs corresponding to the gear speeds, respectively.

Figure 3:
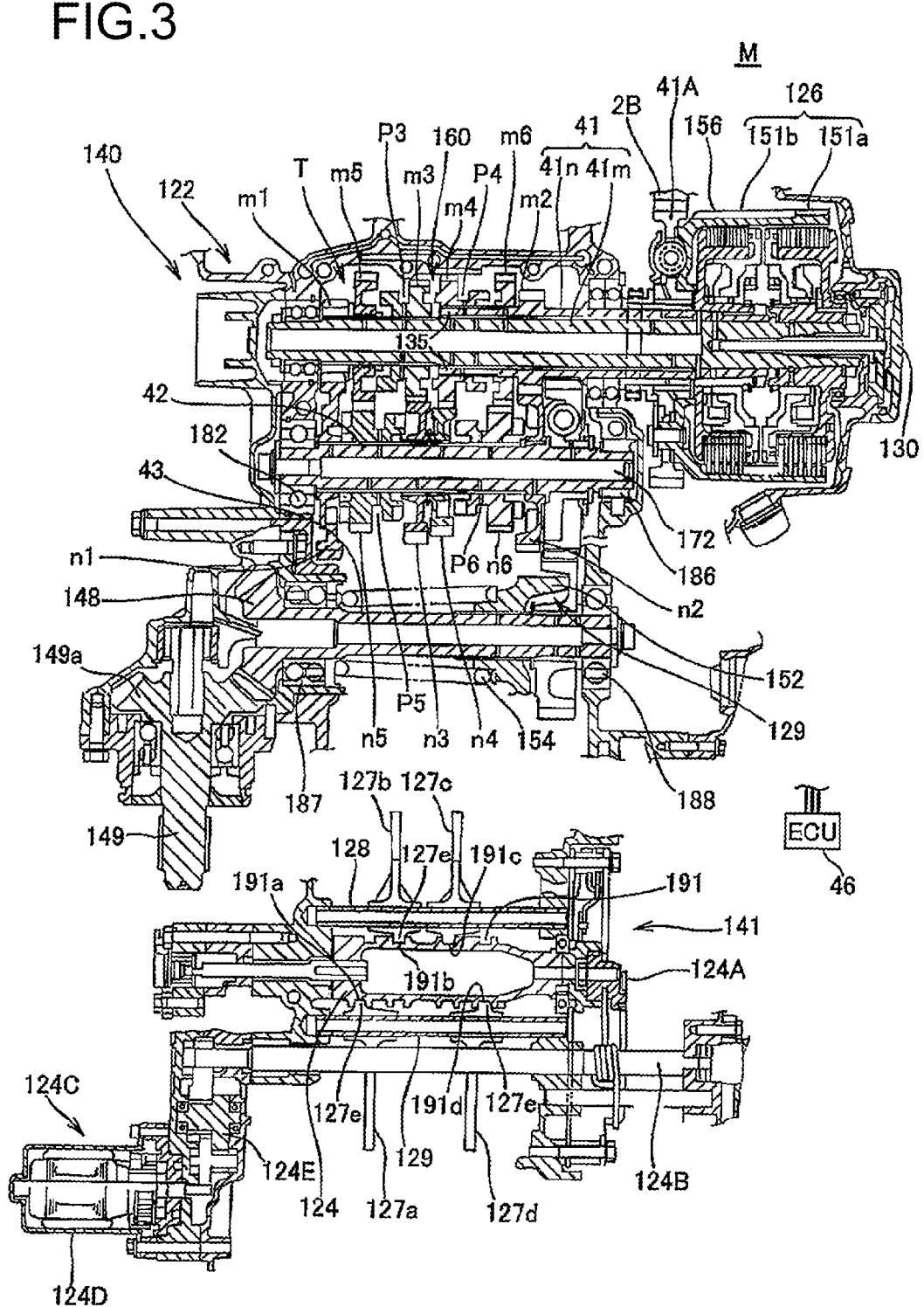
FIG. 3 is a sectional view of a transmission unit.
Figure 4:
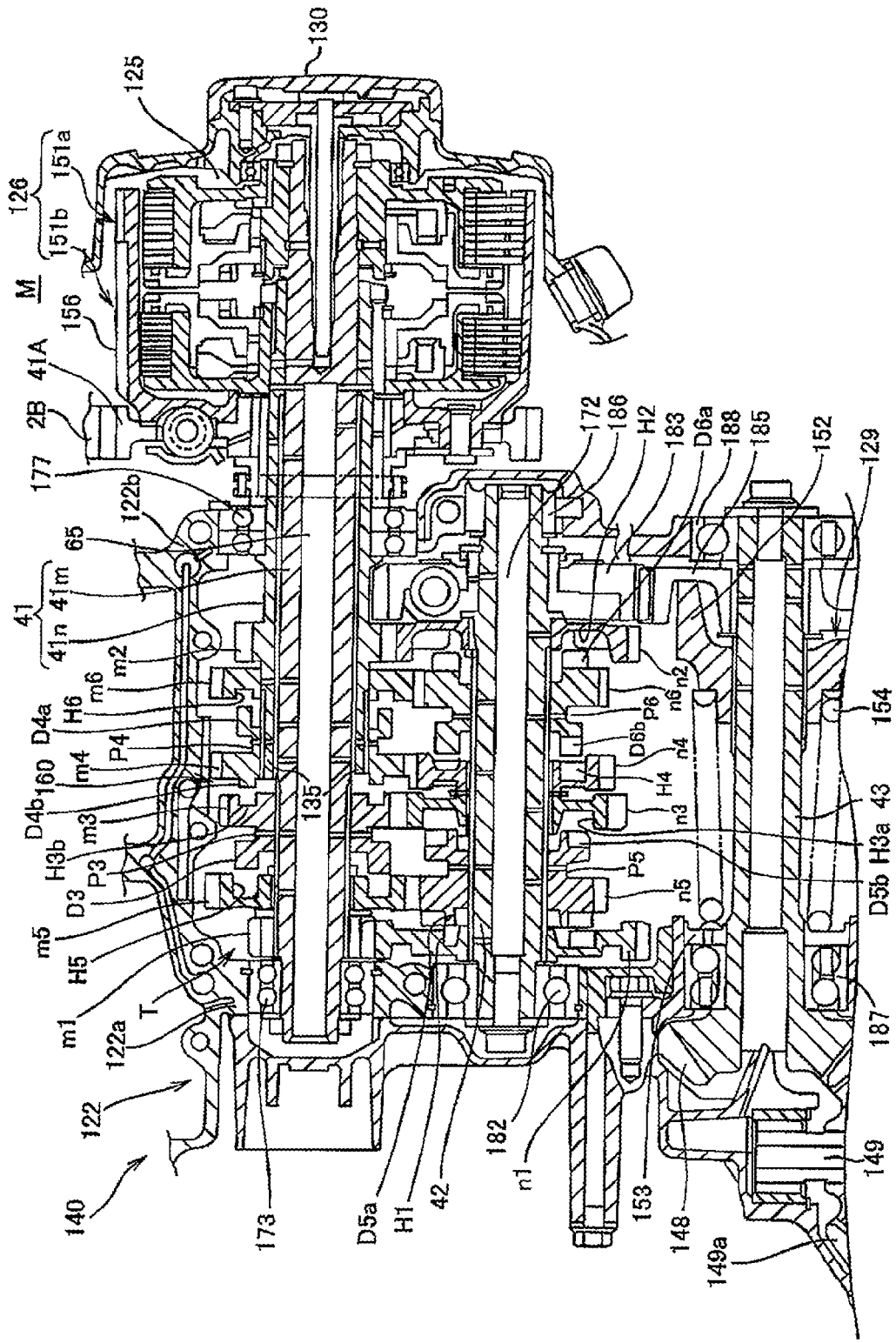
FIG. 4 is an enlarged sectional view of the transmission unit.

FIG. 3 is a sectional view of the transmission unit M. FIG. 4 is an enlarged sectional view of the transmission unit M.

A transmission case 122 is disposed on the rear side of and continuously with the crankcase 3. The transmission unit M includes a twin-clutch type transmission unit 140 for transmission and interruption of input from the crankshaft 2, and a gear shifting device 141 for gear shifting. The twin-clutch type transmission unit 140 and the gear shifting device 141 are arranged inside the transmission case 122. The motorcycle 100 has an ECU 46 as an electronic control unit for controlling the twin-clutch type transmission unit 140 and the gear shifting device 141.

The transmission unit M (twin-clutch type transmission unit) of an automatic transmission type is configured with the twin-clutch type transmission unit 140, the gear shifting device 141 and the ECU 46 as main components thereof.

The twin-clutch type transmission unit 140 includes: the main shaft 41 of the inner-outer double structure type having an inner shaft 41m (first input shaft; inner input shaft) and an outer shaft 41n (second input shaft; outer input shaft); a counter shaft 42 and a driving shaft 43 which are disposed in parallel to the main shaft 41; the transmission gears m1 to m6, n1 to n6 which are disposed ranging between the main shaft 41 and the counter shaft 42; a twin clutch 126 coaxially disposed at a right end portion of the main shaft 41; and an oil pressure supplying device (not shown) for supplying the twin clutch 126 with an oil pressure for operation.

The assembly having the main shaft 41, the counter shaft 42, the transmission gears m1 to m6, n1 to n6 and the driving shaft 43 will be referred to as transmission T.

The ECU 46 controls operations of the twin-clutch type transmission unit 140 and the gear shifting device 141 on the basis of information from a vehicle speed sensor (not shown), a throttle position sensor (not shown) at a throttle grip, a throttle valve position sensor (not shown) at the throttle body 23, a storage sensor (not shown) for detecting the storage state of the stand 225 or the side stand 226, etc. and from a mode switch (not shown) and a shift switch (not shown) provided for example on the steering handle 118, thereby shifting the gear speed in the transmission T.

Transmission unit Modes selected by the mode switch include a full-automatic mode in which the gear speed is automatically changed over based on vehicle operation information such as vehicle speed, engine rotating speed, etc. and a semi-automatic mode in which the gear speed is changed over based on operation of the above-mentioned shift switch operated by the driver.

As shown in FIG. 4, the main shaft 41 has a structure in which a right-side portion of the inner shaft 41m extending in the left-right direction is inserted in the outer shaft 41n in a relatively rotatable manner. The inner shaft 41m is rotatably supported on the outer shaft 41n through bearing. On the outer peripheries of the inner and outer shafts 41m and 41n, the drive gears m1 to m6 for six gear speeds of the transmission gears are distributedly disposed. On the other hand, on the outer periphery of the counter shaft 42, the driven gears n1 to n6 for six gear speeds of the transmission gears are disposed.

The drive gears m1 to m6 are meshed with the driven gears n1 to n6 on the basis of each of the corresponding gear speeds, to constitute gear speed pairs corresponding to the gear speeds, respectively. The gear speed pairs decrease in reduction gear ratio (become increasingly higher-speed gears) in the order from the first speed toward the sixth speed.

A left end portion of the inner shaft 41m reaches a left side wall 122a of the transmission case 122, and is rotatably borne on the left side wall 122a through a ball bearing 173. On the other hand, a right end portion of the inner shaft 41m penetrates a right side wall 122b of the transmission case 122 to be exposed in the inside of a clutch containing chamber 125. An intermediate portion in the left-right direction of the inner shaft 41m is rotatably borne on the right side wall 122b of the transmission case 122 through an intermediate portion in the left-right direction of the outer shaft 41n, which similarly penetrates the right side wall 122b, and a ball bearing 177. The clutch containing chamber 125 is constituted of a clutch cover 130 which covers the twin clutch 126 from outside.

The outer shaft 41n is shorter than the inner shaft 41m. Left end portion of the outer shaft 41n terminates at an intermediate portion in the left-right direction of the transmission case 122. The drive gears m2, m4, and m6 corresponding to even-numbered gear speeds (second speed, fourth speed, and sixth speed) are supported on that part of the outer shaft 41n which is located on the left side relative to the right side wall 122b. On the other hand, the drive gears m1, m3, and m5 corresponding to odd-numbered gear speeds (first speed, third speed, and fifth speed) are supported on that part of the inner shaft 41*m* which is located on the left side relative to the left end 135 of the outer shaft 41*n* (an end portion of the outer input shaft).

Left and right end portions of the counter shaft 42 are rotatably borne on the left and right side walls 122*a*, 122*b* of the transmission case 122 through bearings 182, 186. A gear 183 is connected to the right end portion of the counter shaft 42, and is normally in mesh with a gear 185 on the drive gear 43. The drive gear 43 is rotatably borne on the left and right side walls 122*a*, 122*b* of the transmission case 122 through bearings 187, 188.

The driving shaft 43 is fitted with a torque damper 129. The torque damper 129 is for damping any variations in torque exerted thereon, and has a hollow cylindrical member 152 spline-connected to the driving shaft 43 so as to be movable in the axial direction. A spring receiving member 153 is fixed to the driving shaft 43, a coil spring 154 is interposed between the hollow cylindrical member 152 and the spring receiving member 153, and the hollow cylindrical member 152 is thereby biased toward the gear 185 side.

A drive bevel gear 148 is provided integrally on a left end portion of the driving shaft 43, and is meshed with driven bevel gear 149*a* provided integrally on the front end of a shaft portion 149. The shaft portion 149 is connected to the drive shaft 123 (FIG. 1), whereby rotation of the drive shaft 43 is transmitted to the drive shaft 123.

On that part of the counter shaft 42 which is located on the inside of the transmission case 122, the driven gears n1 to n6 corresponding to the gear speeds of the transmission gears are supported, in the same order as the drive gears m1 to m6. The inner shaft 41*m* and the counter shaft 42 are provided therein with in-shaft oil passages 65 and 172 for supplying oil from the oil pump 50, and the transmission gears are supplied with the oil, as required, through the in-shaft oil passages 65, 172.

The twin clutch 126 is coaxially disposed at the right end portion of the main shaft 41. The twin clutch 126 is provided between the crankshaft 2 of the engine 1 and the main shaft 41 of the transmission unit M. The twin clutch 126 controls the connection state between the crankshaft 2 and the main shaft 41.

The twin clutch 126 has a first and a second disc clutch 151*a*, 151*b* (hereinafter sometimes referred to simply as clutches), which are disposed coaxially with and adjacent to each other. The clutches 151*a*, 151*b* are provided at the right ends of the inner and outer shafts 41*m*, 41*n* coaxially. The first disc clutch 151*a* is provided on the inner shaft 41*m*, while the second disc clutch 151*b* is provided on the outer shaft 41*n*.

A clutch outer 156 shared by the clutches 151*a*, 151*b* is coaxially provided with the main shaft side driven gear 41A meshed with the crank-side drive gear 2B on the crankshaft 2. Rotational drive power from the crankshaft 2 is input to the clutch outer 156 through the gears 2B, 41A. The rotational power input to the clutch outer 156 is transmitted individually to the inner and outer shafts 41*m*, 41*n* according to the engagement states of the clutches 151*a*, 151*b*.

The engagement states of the clutches 151*a* and 151*b* are individually controlled by the presence/absence of the oil pressure supply from the oil pressure supplying device (not shown). Normally, one of the clutches 151*a* and 151*b* is put into an engaged state, whereas the other is put into a disengaged state, and transmission of motive power in the transmission T is performed by use of a transmission gear pair connected to one of the inner and outer shafts 41*m*, 41*n*.

Besides, the transmission gear pair to be used next is pre-selected from among the transmission gear pairs connected to the other of the inner and outer shafts 41*m*, 41*n*. Starting from this condition, one of the clutches 151*a* and 151*b* which has been in the engaged state is disengaged, whereas the other which has been in the disengaged state is engaged, whereby the power transmission in the transmission T is changed over to power transmission by use of the pre-selected transmission gear pair. As a result, shift-up or shift-down in the transmission T is achieved.

More in detail, the first disc clutch 151*a* is engaged in the cases of the first speed, the third speed and the fifth speed, whereas the second disc clutch 151*b* is engaged in the cases of the second speed, the fourth speed and the sixth speed. Thus, in the twin-clutch type transmission unit 140, gear shift is performed by alternately disengaging and engaging the first and second disc clutches 151*a* and 151*b* on the basis of each speed in the range from the first speed to the sixth speed. In addition, in this first embodiment, the first and second disc clutches 151*a* and 151*b* are both engaged at the time of vehicle starting by use of the first speed, as will be described later.

Figure 5:
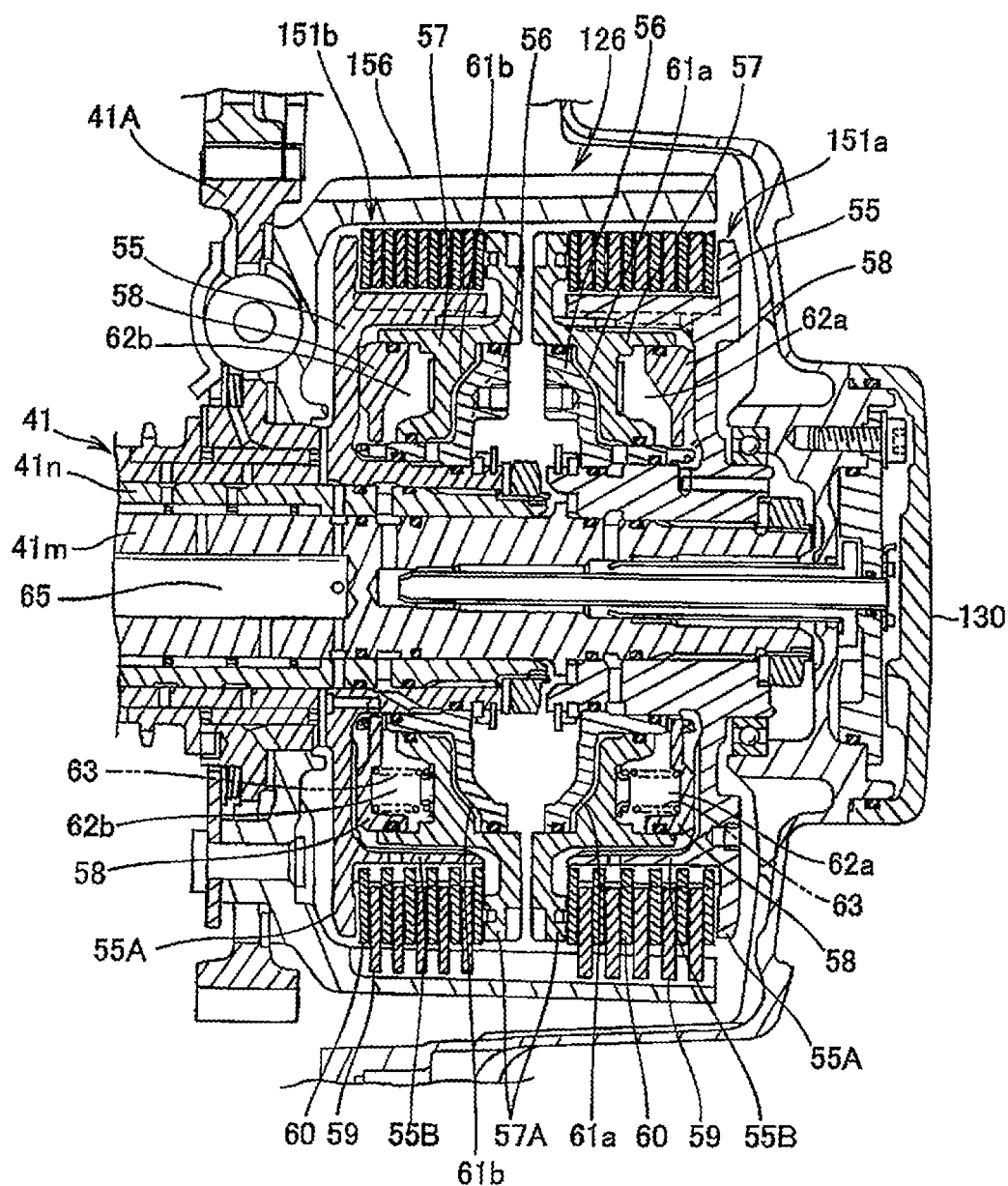
FIG. 5 is a sectional view of a twin clutch.

FIG. 5 is a sectional view of the twin clutch 126.

Now, the second disc clutch 151*b* will be described in detail below. Besides, the first disc clutch 151*a* is substantially the same as the second disc clutch 151*b* in structure, and is provided on the inner shaft 41*m* in a symmetrical positional relationship with the second disc clutch 151*b*; therefore, detailed description of the first disc clutch 151*a* will be omitted.

The second disc clutch 151*b* includes: a circular disc-shaped clutch center 55 fixed to an outer peripheral surface of the outer shaft 41*n*; a circular disc-shaped clutch piston guide 56 facing the clutch center 55; a circular disc-shaped clutch piston 57 provided between the clutch center 55 and the clutch piston guide 56; a canceller plate 58 provided between the clutch piston 57 and the clutch center 55; and drive friction discs 59 and driven friction discs 60 which are provided between a pressure receiving plate part 55A of the clutch center 55 and a pressing plate part 57A of the clutch piston 57.

The second disc clutch 151*b* has a second-side control pressure oil chamber 61*b* defined by the clutch piston guide 56 and the clutch piston 57. The clutch piston 57 is slid toward the clutch center 55 side, by supply of an oil pressure to the second-side control oil pressure chamber 61*b*.

In addition, the second disc clutch 151*b* has a second-side canceller chamber 62*b* defined by the clutch piston 57 and the canceller plate 58. The second-side canceller chamber 62*b* is supplied with lubricating oil. A plurality of return springs 63, for biasing the clutch piston 57 toward the clutch piston guide 56 side against the oil pressure in the second-side control oil pressure chamber 61*b*, are provided in the second-side canceller chamber 62*b*.

The clutch center 55 has a hollow cylindrical part 55B extending in the axial direction coaxially with the main shaft 41. The driven friction discs 60 are spline-connected to an outer peripheral surface of the hollow cylindrical part 55B, and are rotated as one body with the clutch center 55. The drive friction discs 59 are spline-connected to an inner peripheral surface of the clutch outer 156, and are rotated as one body with the clutch outer 156. Pluralities of the drive friction discs 59 and the driven clutch discs 60 are alternately and overlappingly arranged between the pressure receiving plate part 55A and the pressing plate part 57A.

When an oil pressure is supplied into the second-side control oil pressure chamber 61*b* and the clutch piston 57 is thereby slid toward the clutch center 55 side, the drive friction discs 59 and the driven friction discs 60 are pressed by the pressing plate part 57A to make close contact with each other, resulting in an engaged state in which the clutch outer 156 and the clutch center 55 are rotated as one body. When the oil pressure in the second-side control oil pressure chamber 61b is released, the clutch piston 57 is returned toward the clutch piston guide 56 side by the return springs 63, whereby the second disc clutch 151b is put into a disengaged state.

In addition, the first disc clutch 151a includes: a circular disc-shaped clutch center 55 fixed to an outer peripheral surface of the inner shaft 41m; a clutch piston guide 56; a clutch piston 57; a canceller plate 58; drive friction discs 59 and driven friction discs 60; a first-side control oil pressure chamber 61a; a first-side canceller chamber 62a; and return springs 63.

Thus, in the twin clutch 126, when the first-side and second-side control oil pressure chambers 61a, 61b are supplied with oil pressures, the first and second disc clutches 151a, 151b are respectively put into the disengaged state, and when the oil pressures in the first-side and second-side control oil pressure chamber 61a, 61b are released, the first and second disc clutches 151a, 151b are respectively put into the disengaged state.

As shown in FIG. 4, the transmission T is of the normally meshed type in which the drive gears m1 to m6 and the driven gears n1 to n6 corresponding to the gear speeds respectively are normally meshed with each other. The gears m1 to m6, n1 to n6 are classified into fixed gears which can be rotated as one body with the support shaft therefor (main shaft 41, counter shaft 42), free gears which can be rotated relative to the support shaft and cannot be moved in the axial direction, and slide gears which can be rotated as one body with the support shaft and can be moved in the axial direction.

Specifically, the drive gears m1 and m2 are set as fixed gears, while the drive gears m3 and m4 are set as slide gears, and the drive gears m5 and m6 are free gears. In addition, the driven gears n1 to n4 are set as free gears, whereas the driven gears n5 and n6 are set as slide gears. Hereinafter, the gears m3, m4, n5, and n6 will be referred to as slide gears, whereas the gears m5, m6, and n1 to n4 will be referred to as free gears. Each of the slide gears is spline-fitted onto the support shaft therefor.

The slide gear m3 (the gear provided on the inner input shaft) is provided at its side surface with dogs D3 projecting in the axial direction. The dogs D3 can be connected into dog holes H5 formed in the free gear m5. The slide gear n5 is provided with dogs D5a and D5b on both sides thereof in the axial direction. The dogs D5a on one side can be connected into dog holes H1 formed in the free gear n1, while the dogs D5b on the other side can be connected into dog holes H3a formed in the free gear n3.

The slide gear m4 (the gear provided on an end portion of the outer input shaft) is provided with dogs D4a, which can be connected into dog holes H6 formed in the free gear m6. In addition, the slide gear m4 is provided with dogs D4b projecting in the axial direction toward the opposite side of the dogs D4a, and the dogs D4b can be connected into dog holes H3b formed in the slide gear m3.

The slide gear n6 is provided with dogs D6a and D6b on the both sides thereof. The dogs D6a on one side can be connected into dog holes H2 formed in the free gear n2, whereas the dogs D6b on the other side can be connected into dog holes H4 formed in the free gear n4.

The dogs D3, D5a, D5b, D4a, D4b, D6a and D6b, and the dog holes H5, H1, H3a, H6, H3b, H2 and H4 are relatively non-rotatably engaged with each other when the corresponding slide gear and free gear come close to each other, and are disengaged from each other when the corresponding slide gear and the free gear come away from each other. With one of the slide gear relatively non-rotatably engaged with the corresponding free gear through the dogs, the free gear is fixed to the support shaft, resulting in that motive power can be transmitted between the main shaft 41 and the counter shaft 42 through selective use of one of the transmission gear pairs for the first to sixth speeds. In a condition in which all the slide gears and the free gears are disengaged, transmission of motive power between the main shaft 41 and the counter shaft 42 is disabled, that is, a neutral condition is established.

The drive gear m4 provided at the left end 135 of the outer shaft 41n and the drive gear m3 on the inner shaft 41m adjacent to the drive gear m4 are integrally interconnected through the process in which the drive gear m4 and the drive gear m3 are slid toward each other and the dogs D4b of the drive gear m4 are connected into the dog holes H3b in the drive gear m3. In this condition, the outer shaft 41n and the inner shaft 41m are integrally interconnected through the drive gears m3 and m4, so that the outer shaft 41n and the inner shaft 41m can be rotated synchronously and as one body. In addition, when the drive gear m4 and the drive gear m3 are slid away from each other, the dogs D4b and the dog holes H3b are disengaged from each other, so that the outer shaft 41n and the inner shaft 41m are disconnected from each other.

In other words, the dogs D4b and the dog holes H3b constitute a dog-type clutch 160 (synchronizing means; clutch device) by which the connection/disconnection state between the outer shaft 41n and the inner shaft 41m can be switched over. The dog-type clutch 160 is means for synchronizing the rotation of the outer shaft 41n and the rotation of the inner shaft 41m.

Now, the gear shifting device 141 will be described below.

As shown in FIG. 3, the gear shifting device 141 is so configured that, by rotation of a hollow cylindrical shift drum 124 disposed in parallel to the main shaft 41 and the counter shaft 42, four shift forks 127a, 127b, 127c, 127d are moved in the axial direction so as to change over the transmission gear pair (gear speed) used for power transmission between the main shaft 41 and the counter shaft 42. The shift drum 124 is provided in its outer peripheral surface with four cam grooves 191a, 191b, 191c, 191d in which the four shift forks 127a, 127b, 127c, 127d are to be fitted, respectively. The cam grooves 191a to 191d are formed along the circumferential direction of the shift drum 124.

The shift fork 127b extends toward the main shaft 41 side, and is fitted into a recess P3 formed in the slide gear m3, whereas the shift fork 127c is fitted into a recess P4 formed in the slide gear m4. In addition, the shift forks 127a and 127d extend toward the counter shaft 42 side. The shift fork 127a on one side is fitted into a recess P5 formed in the slide gear n5, whereas the shift fork 127d on the other side is fitted into a recess P6 formed in the slide gear n6. The shift forks 127a, 127b, 127c, 127d are supported on their base end side on a pair of shift fork rods 128 and 129 in an axially movable manner. The shift forks 127a, 127b, 127c, 127d are provided on their base end side with slide projections 127e to be engaged in the cam grooves 191a, 191b, 191c, 191d of the shift drum 124.

As shown in FIG. 3, the right end of the shift drum 124 is connected to a shift spindle 124B through a ratchet mechanism 124A for controlling the rotation amount of the shift drum 124.

A shift control device 124C is connected to the left end of the shift spindle 124B (FIG. 3). The shift control device 124C has a shift motor 124D, to which the shift spindle 124B is connected through a gear train 124E.

Rotation of the shift motor 124D causes rotation of the shift drum 124 through the gear train 124E, the shift spindle 124B and the ratchet mechanism 124A. When the shift drum 124 is rotated, the shift forks 127a, 127b, 127c, 127d are moved in the axial direction along patterns (FIG. 6) of the cam grooves 191a, 191b, 191c, 191d in the outer periphery of the shift drum 124. Attendance on this, the corresponding slide gear is moved in the axial direction, whereby the gear speed in the transmission T is changed (shifted).

Now, operation of the transmission unit M will be described below.

Figure 6:
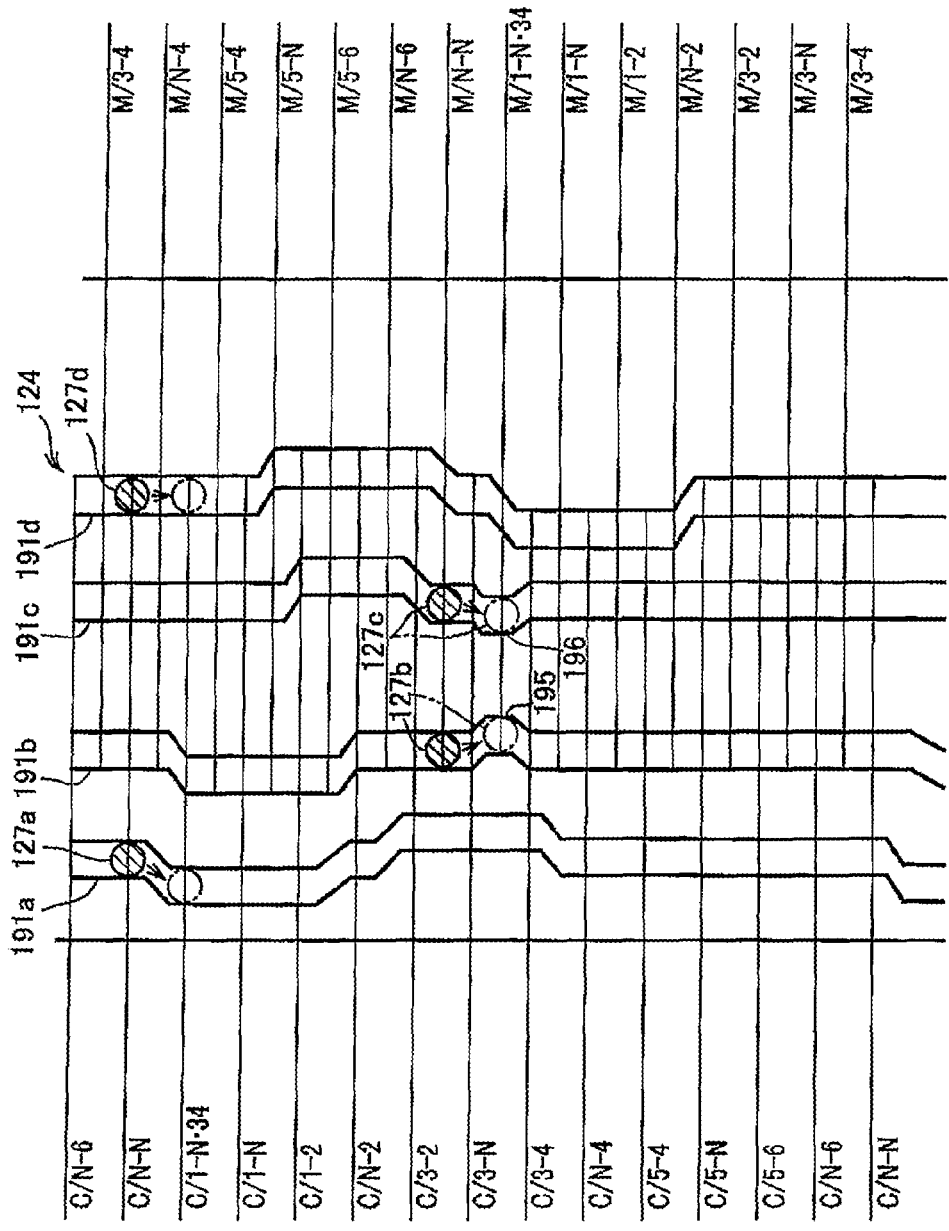
FIG. 6 is a development showing cam grooves in the first embodiment.

FIG. 6 is a development showing the cam grooves 191a to 191d in the first embodiment.

As shown in FIG. 6, at the time of starting of the engine 1, the shift forks 127a, 127b, 127c, 127d are in shift positions of the cam grooves 191a to 191d, that is, they are in position C/N-N and M/N-N. Here, C indicates the counter shaft 42, M indicates the main shaft 41, the symbol preceding the hyphen (-) indicates the state of odd-numbered speeds, and the symbol following the hyphen (-) indicates the state of even-numbered speeds. In addition, symbol N indicates the neutral condition in which the dogs D3, D5a, D5b, D4a, D4b, D6a and D6b are disengaged. Accordingly, symbol C/N-N represents a shift position in which the dogs are disengaged at the odd-numbered speeds and the even-numbered speeds at the counter shaft 42, and symbol M/N-N represents a shift position in which the dogs are disengaged at the odd-numbered speeds and the even-numbered speeds at the main shaft 41. Besides, the ECU 46 normally monitors the shift position conditions through sensors (not shown).

Each of the cam grooves 191a to 191d is provided with an N position corresponding to the neutral condition, and provided continuously with stepped portions one step (one shift position) shifted to the left and right, respectively, with the N position as a reference. Each of the slide projections 127e is located in one of the left position, the central position, and the right position in each of the cam grooves 191a to 191d, whereby each of the corresponding slide gears is selectively moved into three positions arranged in the axial direction.

When the engine 1 of the motorcycle 100 is running and the vehicle is at stop, the first and second disc clutches 151a and 151b are both kept in the disengaged state. Then, when the motorcycle 100 is detected to be in a preparatory state for starting in a case where the side stand 226 is stored during a full-automatic mode or a case where the shift switch is operated into the first speed during a semi-automatic mode or in a similar situation, the ECU 46 operates the shift drum 124 to shift the transmission T from the neutral condition to the first speed, and controls the engagement state of the twin clutch 126 correspondingly to the rise in the rotating speed of the engine 1 from this condition, whereby the motorcycle 100 is started to run.

Specifically, when the motorcycle 100 is detected to be in the preparatory state for starting, the shift drum 124 is rotated under the control by the ECU 46 and through the shift motor 124D. The shift forks 127a and 127b are moved in the directions of arrows along the cam grooves 191a and 191d corresponding to the counter shaft 42 side from C/N-N to C/1-N•34, and the shift forks 127b, 127c are moved in the directions of arrows along the cam grooves 191b and 191c corresponding to the main shaft 41 side to M/1-N•34.

Specifically, in C/1-N•34, the shift fork 127a is moved by one shift position amount from the neutral position toward the left end side of the shift drum 124, whereby the slide gear n5 is moved toward the free gear n1 side, whereas the shift fork 127d is kept in the neutral position. Besides, in M/1-N•34, the shift forks 127b and 127c are moved in the cam grooves 191b and 191c to connection groove parts 195 and 196 formed at positions deviated by one shift position amount toward the center of the shift drum 124. Attendant on this, the slide gears m3 and m4 are moved toward each other.

C/1-N•34 is a condition where the dogs D5a of the slide gear n5 are connected into the dog holes H1 of the free gear n1 (a condition where the gear n1 is in-gear) on the odd-numbered speed side of the counter shaft 42; on the even-numbered speed side, on the other hand, the dogs are in a disengaged state. Specifically, in C/1-N•34, the free gear n1 is fixed to the counter shaft 42 by the slide gear n5, the pair of the drive gear m1 and the thus fixed free gear n1 enables transmission by the first-speed gears, and rotation is transmitted from the main shaft 41 to the counter shaft 42. Here, the in-gear state means a condition wherein a gear paired with a given gear can be driven by the given gear; the disengaged state of the dogs means a condition wherein connection by dogs is absent and, therefore, power transmission between paired gears is not carried out.

M/1-N•34 is a condition where the odd-numbered speed side of the main shaft 41 is in-gear with the gear m1, whereas the dog D4a on the even-numbered speed side is in the disengaged state. Further, in M/1-N•34, the dogs D4b of the slide gear m4 and the dog holes H3b of the slide gear m3 are interconnected, and the outer shaft 41n and the inner shaft 41m are integrally connected. Then, in the condition where the outer shaft 41n and the inner shaft 41m are thus interconnected, the ECU 46 controls the oil pressure to put both the first and second disc clutches 151a and 151b into the engaged state, whereby an output from the crankshaft 2 is transmitted to the main shaft 41 by use of both the first and second disc clutches 151a and 151b, and the motorcycle 100 is started running through the functions of the first-speed gears (gear m1, gear n1).

Thus, at the time of vehicle starting accompanied by high load on the clutch, the outer shaft 41n and the inner shaft 41m are interconnected and both the first and second disc clutches 151a and 151b are used, thereby enlarging the clutch capacity at the time of vehicle starting. Therefore, the capacity of each of the first and second disc clutches 151a and 151b can be reduced according to the capacity needed during normal vehicle running, so that reduction in the size and weight of the twin-clutch type transmission unit 140 can be contrived.

Specifically, with the first and second disc clutches 151a and 151b simultaneously put into the engaged state, heat capacity and torque capacity are doubled; consequently, it is possible to reduce the numbers and diameters of the drive friction discs 59 and the driven friction discs 60, and thereby to reduce the twin clutch 126 in size in the radial direction or the axial direction.

In addition, with the cam grooves 191b and 191c provided with the connection groove parts 195 and 196, the dog-type clutch 160 can be changed over by moving the slide gears m3 and m4. Therefore, a configuration in which the connection state between the outer shaft 41n and the inner shaft 41m can be changed over can be realized in a simple configuration, without providing other component parts for interconnecting the outer shaft 41n and the inner shaft 41m.

Further, since both the slide gears m3 and m4 are moved toward each other by the connection groove parts 195 and 196, the moving amounts of the slide gears m3 and m4 can be reduced, whereby it is possible to enhance the degree of freedom in layout of other gears disposed on the main shaft 41 and the counter shaft 42.

Besides, the slide gear m4 disposed on that left end 135 of the outer shaft 41n which is on the opposite side of the second disc clutch 151b and that slide gear m3 on the inner shaft 41m which is adjacent to the slide gear m4 are interconnected, so that the outer shaft 41n and the inner shaft 41m can be interconnected using a simple configuration.

Next, when the rotation of the engine 1 is detected to have reached a predetermined rotating speed after the starting of the motorcycle 100, the ECU 46 rotates the shift drum 124 and moves the shift position to C/1-N and M/1-N.

C/1-N is a condition wherein the positions of the shift forks 127a and 127d are the same as in C/1-N•34 and wherein power transmission by the first speed can be performed.

M/1-N is a condition wherein the positions of the shift forks 127b and 127c are the same as in M/N-N and wherein the outer shaft 41n and the inner shaft 41m having been in connection in M/1-N•34 are disconnected from each other. Besides, in M/1-N, the second disc clutch 151b is disengaged under the control by the ECU 46, and only the first disc clutch 151a provided on the inner shaft 41m is in the engaged state, so that the output from the crankshaft 2 is transmitted to the counter shaft 42 through the first-speed gears.

Here, the predetermined rotating speed is a rotating speed corresponding to the condition where the load acting on the twin clutch 126 is sufficiently low at the time of vehicle starting; for example, it is a rotating speed such that the load is lowered to be comparable to the load acting on the twin clutch 126 at the time of a normal shifting operation during vehicle running, such as a shift from the second speed to the third speed.

Thus, when the engine 1 has reached a predetermined rotating speed after the vehicle starting, the outer shaft 41n and the inner shaft 41m are disconnected from each other and power transmission is conducted by only the inner shaft 41m, whereby rotation of both the outer shaft 41n and the gears on the outer shaft 41n can be prevented from occurring after the vehicle starting. Therefore, loss due to rotation of the outer shaft 41n and the gears provided on the outer shaft 41n can be eliminated, whereby fuel consumption can be improved.

In addition, M/1-N•34 is provided at a position between M/N-N and M/1-N, that is, those positions of the cam grooves 191b and 191c which are located between the neutral condition and the first speed, whereby it is ensured that the connection state between the outer shaft 41n and the inner shaft 41m can be changed smoothly in a process in which the shift forks 127b and 127c are each moved from the neutral condition to the first speed.

Then, when it is detected that the first speed is established by engagement of only the first disc clutch 151a, the ECU 46 rotates the shift drum 124, to move the shift position to C/1-2 and M/1-2.

C/1-2 is a condition in which the odd-numbered speed side of the counter shaft 42 is in-gear with the gear n1 whereas the even-numbered side is in-gear with the gear n2. M/1-2 is a condition in which the odd-numbered speed side of the main shaft 41 is in-gear with the gear m1 whereas the even-numbered speed side is in-gear with the gear m2. This stage is a preparatory shift stage, in which only the first disc clutch 151a is engaged, with the second disc clutch 151b being in the disengaged state.

In the case where a shift to the second speed is judged based on vehicle speed or engine rotating speed or the like during a full-automatic mode or in the case where the shift switch is operated into the second speed during a semi-automatic mode, the ECU 46 disengages the first disc clutch 151a and engages the second disc clutch 151b, thereby shifting to the vehicle running based on the second speed. Since the preparatory shift has already been performed in the transmission T, the second speed can be established by only changing over the engagement state of the twin clutch 126. Accordingly, a speedy and smooth gear shift can be performed, without any time lag or any disconnection at the time of the shift.

When the establishment of the second speed is detected, the ECU 46 rotates the shift drum 124, to move the shift position through C/N-2 to C/3-2 on side of the counter shaft 42 and to move the shift position through M/N-2 to M/3-2 on the side of the main shaft 41.

C/N-2 is a condition in which the dogs are disengaged on the odd-numbered speed side of the counter shaft 42 whereas the even-numbered speed side is in-gear with the gear n2. M/N-2 is a condition in which the dogs are disengaged on the odd-numbered speed side of the main shaft 41 whereas the even-numbered speed side is in-gear with the gear m2. In this condition, only the second disc clutch 151b is engaged.

In addition, C/3-2 is a condition in which the odd-numbered speed side of the counter shaft 42 is in-gear with the gear n3 whereas the even-numbered speed side is in-gear with the gear n2. M/3-2 is a condition in which the odd-numbered speed side of the main shaft 41 is in-gear with the gear m3 whereas the even-numbered speed side is in-gear with the gear n2. This stage, also, is a preparatory shift stage.

In the case where a shift to the third speed is judged based on vehicle speed or engine rotating speed or the like during a full-automatic mode or in the case where the shift switch is operated into the third speed during a semi-automatic mode, the ECU 46 disengages the second disc clutch 151b and engages the first disc clutch 151a, thereby shifting to the vehicle running based on the third speed.

Since the preparatory shift has already been performed in the transmission T, the third speed can be established by only changing over the engagement state of the twin clutch 126. Subsequently, shift-up operations to establish the fourth speed, the fifth speed and the sixth speed are performed in the same manner as above. The shift-down operations are also carried out similarly, and therefore, description thereof is omitted.

As discussed above, according to the first embodiment of the present invention, the dog-type clutch 160 is provided for synchronizing the rotations of the inner shaft 41m and the outer shaft 41n provided respectively with the first and second disc clutches 151a and 151b for transmission and interruption of the input from the engine 1. At the time of starting of the motorcycle 100, the inner shaft 41m and the outer shaft 41n are interconnected by the dog-type clutch 160, and both the first and second disc clutches 151a and 151b are put into the engaged state. Therefore, at the time of vehicle starting, the input from the crankshaft 2 can be transmitted to the main shaft 41 by using both the clutches 151a and 151b. This ensures that the capacity of each of the first and second disc clutches 151a and 151b provided on the inner shaft 41m and the outer shaft 41n can be reduced according to the capacity needed during normal vehicle running. Accordingly, it is possible to contrive reductions in the size and weight of the twin-clutch type transmission unit M.

In addition, at the time when the rotation of the engine 1 has reached to a predetermined rotating speed after the starting of the motorcycle 100, the inner shaft 41m and the outer shaft 41n are disconnected from each other, whereby rotation of both the inner shaft 41m and the outer shaft 41n can be prevented from occurring after the vehicle starting. As a result, fuel consumption can be improved.

Besides, the inner shaft 41m and the outer shaft 41n having the inner-outer double shaft are synchronized by the dog-type clutch 160 provided between the left end 135 of the outer shaft 41n and the inner shaft 41m. Therefore, connection and disconnection between the inner shaft 41m and the outer shaft 41n can be achieved using a simple configuration.

Further, the clutch device for interconnecting the inner shaft 41m and the outer shaft 41n includes the dog-type clutch 160 by which the slide gear m4 provided at the left end 135 of the outer shaft 41n and the slide gear m3 provided on the inner shaft 41m adjacently to the slide gear m4 are moved in the axial direction to be fitted to each other. Accordingly, connection and disconnection between the inner shaft 41m and the outer shaft 41n can be performed while adopting a simple configuration.

The first illustrative embodiment, discussed herein, is merely showing a mode to which the present invention is applied, and the invention is not limited to the above first embodiment.

In the above first embodiment, the dog-type clutch 160 has been described to have a configuration in which the slide gear m4 and the slide gear m3 are moved in the axial direction to be fitted to each other, but the present invention is not restricted to this configuration. The dog-type clutch 160 may be so configured that at least one of the slide gear m4 and the slide gear m3 is moved in the axial direction to achieve fitting between the slide gears.

Besides, in the above first embodiment, it has been described that the inner shaft 41m and the outer shaft 41n are disconnected from each other at the time when the rotation of the engine 1 has reached a predetermined rotating speed after the starting of the motorcycle 100, but this is not limitative of the present invention.

For example, the inner shaft 41m and the outer shaft 41n may be disconnected from each other at the time when a predetermined vehicle speed is reached, based on the vehicle speed detected by a vehicle speed sensor or the like. In addition, detailed configurations of the motorcycle 100 may naturally be modified in various ways.

Second Embodiment

Now, a second illustrative embodiment of the present invention will be described below referring to FIG. 7. In the second embodiment, the parts configured in the same manner as in the above-described first embodiment are denoted by the same reference symbols as used above, and descriptions of them will be omitted.

The second embodiment differs from the first embodiment in that a shift drum 227 is provided with C/1-2•P and M/1-2•P which constitute a parking position for locking any movement of the motorcycle 100 when the motorcycle 100 is parked.

Meanwhile, conventionally, in relation to an automatic transmission for vehicle, there has been proposed a parking lock mechanism in which a parking shift fork is provided separately from shift forks for selectively establishing one of gear trains for a plurality of gear speeds, the parking shift fork is fixed to a parking rod, and the parking rod is operated in the axial direction so as to establish two gear trains, thereby obtaining parking lock. For example, see, Patent Document, Japanese Patent Laid-Open No. 2006-105221.

According to the Japanese Patent Laid-Open No. 2006-105221, however, the parking shift fork is needed separately from the shift forks for selectively establishing one of the gear trains for a plurality of gear speeds, so that the number of component parts is increased, leading to an enlargement of the transmission in size.

Therefore, it is desired to provide a parking lock mechanism for a transmission by which a reduction in the number of component parts of the transmission can be contrived and the size of the transmission can be reduced.

Figure 7:
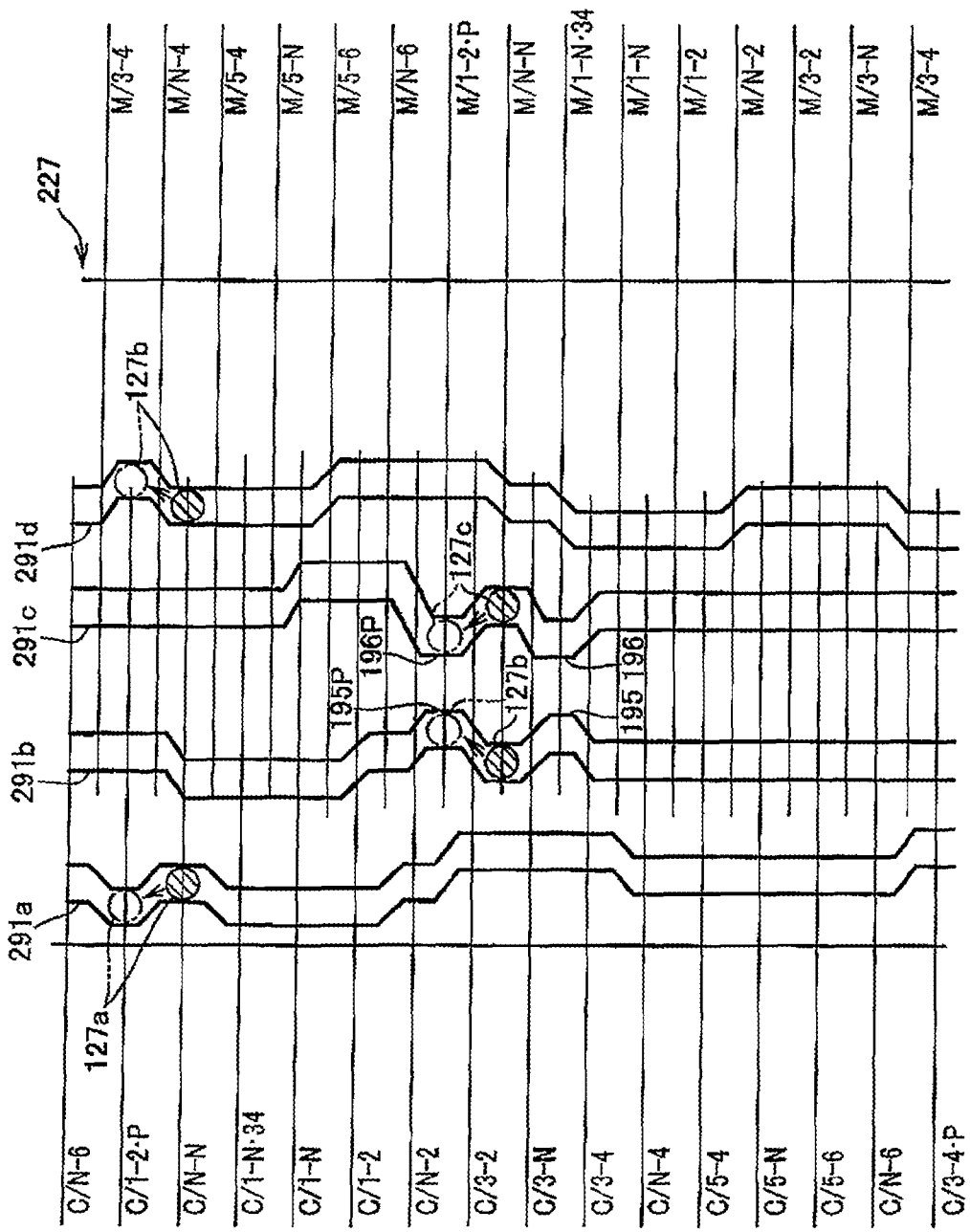
FIG. 7 is a development showing cam grooves in a second embodiment.

FIG. 7 is a development showing cam grooves 291a to 291d in the second embodiment.

In a motorcycle 100 according to the second embodiment, when the motorcycle 100 is stopped, an ECU 46 for a transmission unit M disengages a first disc clutch 151a and a second disc clutch 151b, irrespectively of the gear speed immediately before the stoppage, and controls the driving of a shift motor 124D to rotate a shift drum 227, whereby shift forks 127a, 127b, 127c, 127d are moved within cam grooves 291a to 291d, and the shift position is returned into a neutral position, namely, C/N-N and M/N-N, shown in FIG. 7. In other words, the transmission unit M is an automatic transmission such that power transmission from a crankshaft 2 is interrupted when the vehicle is stopped and when the vehicle is parked.

The shift drum 227 is a hollow cylindrical shift drum provided in place of the shift drum 124 in the first embodiment, and its axis is set in parallel to a main shaft 41 and a counter shaft 42. The cam grooves 291a to 291d are formed in an outer peripheral surface of the shift drum 227 along the circumferential direction.

In this second embodiment, like in the first embodiment, the shift forks 127a, 127b, 127c, 127d are engaged with the cam grooves 291a, 291b, 291c, 291d, whereby selective establishment of gear trains corresponding to shift positions (first speed to sixth speed) is performed. In addition, the cam grooves 291a and 291d have C/1-2•P as a parking position, and the cam grooves 291b and 291c have M/1-2•P as a parking position. C/1-2•P and M/1-2•P constitute a shift position for simultaneously establishing at least two gear trains selected.

More in detail, C/1-2•P is provided adjacently to C/N-N on the side opposite to the side of C/1-N•34, in each of the cam grooves 291a and 291d. M/1-2•P is provided adjacently to M/N-N on the side opposite to the side of M/1-N•34 in each of the cam grooves 291b and 291c. In other words, C/1-2•P and M/1-2•P constitute a shift position which is selected by rotating the shift drum 227 by one shift position amount from the state of C/N-N and M/N-N toward the side opposite to the side of C/1-N•34 and M/1-N•34.

M/1-2•P is a shift position where the positions of the shift forks 127b and 127c are the same as those in M/1-N•34. In M/1-2•P, the shift forks 127b and 127c are fitted in parking connection groove parts 195P and 196P formed at positions deviated by one shift position amount from the neutral positions toward the center of the shift drum 227. In this condition, the slide gear m4 and the slide gear m3 are fitted to each other by the dog-type clutch 160, and, in M/1-2•P, the inner shaft 41m and the outer shaft 41n are integrally connected to each other so as to be incapable of relative rotation. In addition, the slide gears m3 and m4 are slide gears which are spline-fitted to the main shaft 41, and are fixed to the main shaft 41 so that they cannot be rotated relative to the main shaft 41.

C/1-2•P is a shift position where the positions of the shift forks 127a and 127d are the same as those in C/1-2. In C/1-2•P, on the odd-numbered speed side, a free gear n1 is connected to a slide gear n5, so that the free gear n1 is in an in-gear state, whereas on the even-numbered speed side, a free gear n2 is connected to a slide gear n6, so that the free gear n2 is in an in-gear state.

Specifically, when C/1-2•P and M/1-2•P are selected, the free gear n1 and the free gear n2 are simultaneously put into in-gear state in the condition where the inner shaft 41m and the outer shaft 41n are connected to each other. In this condition, relative to the drive gears m1 and m2 on the main shaft 41 having the inner shaft 41m and the outer shaft 41n integrally connected to each other, the free gear n1 and the free gear n2 are simultaneously put into in-gear state and are fixed on the counter shaft 42, so that the gears for the first speed and the second speed which are different in transmission gear ratio are simultaneously meshed so as to be capable of transmitting drive power between the main shaft 41 and the counter shaft 42. By such simultaneous establishment of a plurality of gear trains different in transmission gear ratio (in this second embodiment, the gear trains for the first speed and the second speed), rotation between the main shaft 41 and the counter shaft 42 is locked, and, attendant on this, rotations of the driving shaft 43, the drive shaft 123 and the rear wheel 131 are locked.

In addition, since the rotations of the main shaft 41 and the counter shaft 42 are locked by the simultaneous meshing of the gear trains on the main shaft 41 and the counter shaft 42, the rear wheel 131 can be locked irrespectively of the engagement states of the first and second disc clutches 151a, 151b.

Specifically, in the transmission unit M, it is ensured that even in the condition where the oil pump 50 is stopped attendant on stop of operation of the motorcycle 100 and where a control oil pressure for the twin-clutch type transmission unit 140 is not supplied, namely, where the first and second disc clutches 151a and 151b are in the disengaged state, the rotation of the rear wheel 131 can be locked by rotating the shift drum 227 and selecting C/1-2•P and M/1-2•P.

Further, since the condition where the inner shaft 41m and the outer shaft 41n are interconnected is made to be a parking position, the plurality of gear trains for locking the rotation between the main shaft 41 and the counter shaft 42 can be selected from both the odd-numbered speed side and the even-numbered speed side, so that the degree of freedom in design can be enhanced, as compared with the case where the inner shaft 41m and the outer shaft 41n are not interconnected.

For example, a configuration may be adopted wherein the cam grooves 291a and 291d are so formed that the free gears n3 and n4 are put into in-gear state in the condition where the inner shaft 41m and the outer shaft 41n are interconnected, whereby the free gears n3 and n4 are simultaneously meshed with the drive gears m3 and m4, thereby locking the rotation between the main shaft 41 and the counter shaft 42.

In the second embodiment, when for example the driver operates a parking lever 118A (FIG. 1) provided on the steering handle 118 after the motorcycle 100 is stopped, the shift drum 227 is rotated and C/1-2•P and M/1-2•P are selected, as shown in FIG. 7.

More in detail, the parking lever 118A is connected to the shift drum 227 through wire (not shown), and, when the parking lever 118A is operated, the shift drum 227 is rotated in the direction reverse to the direction for shift-up from the shift position of C/N-N and M/N-N to the sixth-speed position by one speed amount at a time, namely, in the direction of arrows, whereby the shift position reaches C/1-2•P and M/1-2•P.

As a result, the first-speed gear train (n1, m1) on the odd-numbered speed side and the second-speed gear train (n2, m2) on the even-numbered speed side are simultaneously established, whereby the part between the main shaft 41 and the counter shaft 42 is locked, and the rear wheel 131 is locked through the driving shaft 43 and the drive shaft 123.

C/1-2•P and M/1-2•P are located at positions adjacent to and moved by one speed amount in the shift-down direction from the positions of C/N-N and M/N-N corresponding to the neutral condition. In this configuration, therefore, when the parking lever 118A is manually operated after the stop of the motorcycle 100 so as to rotate the shift drum 227 by one shift position amount in the shift-down direction, the shift position immediately reaches C/1-2•P and M/1-2•P, so that parking brake can be applied rapidly.

In addition, since C/1-2•P and M/1-2•P are adjacent to C/N-N and M/N-N and the parking position can therefore be selected by only rotating the shift drum 227 slightly, the operating amount of the parking lever 118A needed can be reduced, so that the driver can easily apply the parking brake.

At the time of starting the motorcycle 100 from a parking state, first, the driver operates the parking lever 118A to release the parking position. Thereafter, when the motorcycle 100 is detected to be in a preparatory state for vehicle starting in the condition where the engine 1 is running, the ECU 46 changes the shift position from the state of C/N-N and M/N-N to the state of C/1-N•34 and M/1-N•34, whereby the motorcycle 100 is started to run by using both the clutches 151a and 151b.

When it is detected after the starting of the motorcycle 100 that the rotation of the engine 1 has reached a predetermined rotating speed, the ECU 46 rotates the shift drum 124 to move the shift position to C/1-N and M/1-N, which is accompanied by disconnection of the outer shaft 41n and the inner shaft 41m from each other.

As above-mentioned, according to the second embodiment of the present invention, the dog-type clutch 160 for synchronizing the rotations of the inner shaft 41m and the outer shaft 41n is provided, and, when the motorcycle 100 is stopped, the rotations of the inner shaft 41m and the outer shaft 41n are synchronized, and one of the gears on the inner shaft 41m and one of the gears on the outer shaft 41n are respectively meshed with gears on the counter shaft 42, specifically, the gears m1 and m2 are meshed with the gears n1 and n2 to permit transmission of drive power.

Consequently, the gears m1 and m2 on the inner shaft 41m and the outer shaft 41n are simultaneously meshed with the gears n1 and n2 on the counter shaft 42, whereby rotation of the counter shaft 42 can be locked. This makes it possible to maintain the parked state of the motorcycle 100, without need to provide a parking brake device or the like for exclusive use for maintaining the parked state of the motorcycle 100. As a result, the number of component parts of the transmission unit M can be reduced, and a reduction in the size of the transmission unit M can be contrived.

In addition, when the rotation of the engine 1 has reached a predetermined rotating speed after starting of the motorcycle 100, the inner shaft 41m and the outer shaft 41n are disconnected from each other, whereby rotation of both the inner shaft 41m and the outer shaft 41n can be prevented from occurring after the vehicle starting. This ensures that fuel consumption can be improved.

Further, since the inner shaft 41m and the outer shaft 41n composed of the inner-outer double shaft are synchronized by the dog-type clutch 160 provided between the left end 135 of the outer shaft 41n and the inner shaft 41m, connection and disconnection between the inner shaft 41m and the outer shaft 41n can be achieved using a simple configuration.

In the second embodiment above, the shift drum 227 has been described to be manually operated by the parking lever 118A through the wire, but this configuration is not limitative of the present invention. For example, a configuration may be adopted in which the shift drum 227 is rotated, so as to select C/1-2•P and M/1-2•P, by a motor which is actuated by the ECU 46 according to an operation on a parking brake switch.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A twin-clutch type transmission unit comprising
a first clutch and a second clutch;
a first input shaft and a second input shaft provided respectively with said clutches for transmission and interruption of input from a prime mover;
a plurality of drive gears provided on the first and second input shafts;
an output shaft provided with a plurality of driven gears operable to selectively mesh with the drive gears, with the clutches of the first input shaft and the second input shaft being alternately disengaged and engaged so as to perform a gear shift; and
a clutch synchronization device for synchronizing rotation of the first input shaft and rotation of the second input shaft, the clutch synchronization device comprising a first drive gear being rotationally fixed on the first input shaft and a second drive gear being rotationally fixed on the second input shaft, said clutch synchronization device being operative to directly connect the first input shaft and the second input shaft;
wherein, at a time of vehicle starting:
the first input shaft and the second input shaft are directly connected to each other by said clutch synchronization device,
the clutches of both the first and second input shafts are simultaneously engaged, such that
motive force from the prime mover is transmitted by the first clutch to the first input shaft and simultaneously by the second clutch to the second input shaft,
the motive force transmitted to the second input shaft by the second clutch is further transmitted from the second input shaft to the first input shaft by the clutch synchronization device,
a sum of the motive force transmitted from the first clutch to the first input shaft and the motive force transmitted from the clutch synchronization device to the first input shaft is transmitted from the first input shaft to the output shaft,
and a loading of the first and second clutches is shared during the time of vehicle starting.

2. The twin-clutch type transmission unit according to claim 1, wherein after the vehicle starting, the first input shaft and the second input shaft are disconnected from each other at a time when rotation of the prime mover reaches a predetermined rotating speed.

3. The twin-clutch type transmission unit according to claim 2, wherein the first input shaft and the second input shaft comprise an inner-outer double shaft having an inner input shaft and an outer input shaft; and
wherein said clutch synchronization device for synchronizing the rotation of the first input shaft and the rotation of the second input shaft is arranged between the inner input shaft and an end portion of the outer input shaft.

4. The twin-clutch type transmission unit according to claim 3, wherein the clutch synchronization device comprises a dog-type clutch in which at least one of the drive gears provided at the end portion of the outer input shaft and one of the drive gears provided on the inner input shaft adjacent to the gear provided at the end portion of the outer input shaft is moved in an axial direction so as to be fitted with the other.

5. The twin-clutch type transmission unit according to claim 1, wherein said clutch synchronization device comprises one of said drive gears formed on the first input shaft having a hole formed therein, and a projection formed on one of adjacent said drive gears formed on the second input shaft; and wherein said hole is operable to engage with said projection.

6. The twin-clutch type transmission unit according to claim 1, wherein said clutch synchronization device is arranged between the first input shaft and an end portion of the second input shaft.

7. A twin-clutch type transmission unit comprising
a first clutch and a second clutch;
a first input shaft and a second input shaft provided respectively with said clutches for transmission and interruption of input from a prime mover;
a plurality of drive gears provided on the first and second input shafts;
an output shaft provided with a plurality of driven gears operable to mesh with the drive gears, with the clutches of the first input shaft and the second input shaft being alternately disengaged and engaged so as to perform a gear shift; and
a clutch synchronization device for synchronizing rotation of the first input shaft and rotation of the second input shaft, the clutch synchronization device being disposed between and operative to directly connect the first input shaft and the second input shaft;
wherein at the time of vehicle stop, the first input shaft and the second input shaft are directly connected with each other by the clutch synchronization device, and a first input gear on the first input shaft and a second input gear on the second input shaft are respectively meshed with a first output gear and a second output gear on the output shaft, wherein the meshing of the first input gear and first output gear forms a first gear speed, the meshing of the second input gear and the second output gear forms a second gear speed, and the simultaneous engagement of the first and second gear speeds effectively locks the output shaft.

8. The twin-clutch type transmission unit according to claim 7, wherein after vehicle starting, the first input shaft and the second input shaft are disconnected from each other at a time when rotation of the prime mover reaches a predetermined rotating speed.

9. The twin-clutch type transmission unit according to claim 7, wherein each of the first input shaft and the second input shaft comprise an inner-outer double shaft having an inner input shaft and an outer input shaft, and the clutch synchronization device for synchronizing the rotation of the first input shaft and the rotation of the second input shaft is provided between the inner input shaft and an end portion of the outer input shaft.

10. The twin-clutch type transmission unit according to claim 8, wherein each of the first input shaft and the second input shaft comprise an inner-outer double shaft having an inner input shaft and an outer input shaft, and the clutch synchronization device for synchronizing the rotation of the first input shaft and the rotation of the second input shaft is provided between the inner input shaft and an end portion of the outer input shaft.

11. The twin-clutch type transmission unit according to claim 7, wherein said clutch synchronization device comprises one of said drive gears formed on the first input shaft having a hole formed therein, and a projection formed on one of adjacent said drive gears formed on the second input shaft; and wherein said hole is operable to engage with said projection.

12. The twin-clutch type transmission unit according to claim 7, wherein said clutch synchronization device is arranged between the first input shaft and an end portion of the second input shaft.

13. A motorcycle comprising
an engine having a crankshaft; and
a twin-clutch type transmission unit operatively connected with said crankshaft;
said twin-clutch type transmission unit comprising
a set of clutches comprising a first clutch and a second clutch;
a first input shaft and a second input shaft provided respectively with said clutches for transmission and interruption of input from the crankshaft;
a plurality of drive gears provided on the first and second input shafts;
an output shaft provided with a plurality of driven gears operable to mesh with drive gears, with the clutches of the first input shaft and the second input shaft being alternately disengaged and engaged so as to perform a gear shift; and
a clutch synchronization device for synchronizing rotation of the first input shaft and rotation of the second input shaft, the clutch synchronization device comprising a first drive gear being rotationally fixed on the first input shaft and a second drive gear being rotationally fixed on the second input shaft, said clutch synchronization device being operative to directly connect the first input shaft and the second input shaft;
wherein at a time of vehicle starting:
the first input shaft and the second input shaft are connected to each other through the clutch synchronization device;
the clutches of both the first and second input shafts are simultaneously engaged; such that motive force from the prime mover is transmitted by the first clutch to the first input shaft and simultaneously by the second clutch to the second input shaft,
the motive force transmitted to the second input shaft by the second clutch is further transmitted from the second input shaft to the first input shaft by the clutch synchronization device,
a sum of the motive force transmitted from the first clutch to the first input shaft and the motive force transmitted from the clutch synchronization device to the first input shaft is transmitted from the first input shaft to the output shaft,
and a loading of the first and second clutches is shared during the time of vehicle starting.

14. A motorcycle according to claim 13, wherein after the vehicle starting, the first input shaft and the second input shaft are disconnected from each other at a time when rotation of the crankshaft reaches a predetermined rotating speed.

15. A motorcycle according to claim 13, wherein said clutch synchronization device is arranged between the first input shaft and an end portion of the second input shaft.

16. A motorcycle according to claim 13, wherein said clutch synchronization device comprises one of said drive gears formed on the first input shaft having a hole formed therein, and a projection formed on one of adjacent said drive gears formed on the second input shaft; and wherein said hole is operable to engage with said projection.

17. A motorcycle according to claim 13, wherein the first input shaft and the second input shaft comprise an inner-outer double shaft having an inner input shaft and an outer input shaft; and
said clutch synchronization device for synchronizing the rotation of the first input shaft and the rotation of the second input shaft is arranged between the inner input shaft and an end portion of the outer input shaft.

18. A motorcycle according to claim 14, wherein the first input shaft and the second input shaft comprise an inner-outer double shaft having an inner input shaft and an outer input shaft; and
said clutch synchronization device for synchronizing the rotation of the first input shaft and the rotation of the second input shaft is arranged between the inner input shaft and an end portion of the outer input shaft.

19. A motorcycle according to claim 17, wherein said set of clutches is arranged at an end portion of the first and second input shafts; and wherein a right-side portion of the inner input shaft extending in the left-right direction is inserted in the outer input shaft such that the inner input shaft is rotatably supported on the outer input shaft through a bearing.

20. A motorcycle according to claim 18, wherein the clutch synchronization device comprises a dog-type clutch in which at least one of the gears provided at the end portion of the outer input shaft and one of the gears provided on the inner input shaft adjacent to said at least one of the gears provided at the end portion of the outer input shaft is moved in an axial direction to be fitted to the said one the gears provided on the inner input shaft.

* * * * *